(12) United States Patent
Schreyer et al.

(10) Patent No.: US 6,295,350 B1
(45) Date of Patent: *Sep. 25, 2001

(54) TELECOMMUNICATION NETWORK WITH LEAST COST ROUTING

(75) Inventors: Oliver Schreyer, Herzogenrath; Henning Maab; Holger Gappisch, both of Aachen, all of (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,913
(22) PCT Filed: Apr. 14, 1997
(86) PCT No.: PCT/IB97/00405
§ 371 Date: Dec. 16, 1997
§ 102(e) Date: Dec. 16, 1997
(87) PCT Pub. No.: WO97/39592
PCT Pub. Date: Oct. 23, 1997

(30) Foreign Application Priority Data

Apr. 16, 1996 (DE) ............................................. 196 14 926

(51) Int. Cl.[7] .................................................... H04M 7/00
(52) U.S. Cl. ...................... 379/221; 379/114; 379/115; 379/117; 379/133; 379/225
(58) Field of Search .................... 379/112, 114, 379/198, 220, 221, 225, 207, 111, 113, 115, 117, 133

(56) References Cited

U.S. PATENT DOCUMENTS

| | | | | |
|---|---|---|---|---|
| 4,594,477 | * | 6/1986 | Noirot | 379/221 |
| 4,791,665 | | 12/1988 | Bogart et al. | 379/207 |
| 5,289,536 | * | 2/1994 | Hokari | 379/221 |
| 5,425,084 | * | 6/1995 | Brinskele | 379/112 |
| 5,452,351 | | 9/1995 | Yamamoto | 379/221 |
| 5,515,425 | | 5/1996 | Penzias | 379/114 |
| 5,539,815 | | 7/1996 | Samba | 379/220 |
| 5,570,417 | * | 10/1996 | Byers | 379/115 |
| 5,712,907 | * | 1/1998 | Wegner et al. | 379/112 |
| 5,715,304 | * | 2/1998 | Nishida et al. | 379/114 |
| 5,764,741 | * | 6/1998 | Barak | 379/114 |
| 5,799,071 | * | 8/1998 | Azar et al. | 379/113 |
| 5,862,203 | * | 1/1999 | Wulkan et al. | 379/114 |
| 5,878,121 | * | 3/1999 | Nakanishi | 379/115 |
| 6,078,652 | * | 6/2000 | Barak | 379/115 |

OTHER PUBLICATIONS

Newton, Newton's Telecom Dictionary, 8th Edition, p. 352, Nov., 1994.*

* cited by examiner

*Primary Examiner*—Creighton Smith
*Assistant Examiner*—Bing Bui
(74) *Attorney, Agent, or Firm*—Steven R. Biren

(57) ABSTRACT

A telecommunication network includes a number of mutually coupled private branch exchanges to which are assigned respective storage locations for storing switching data and which include processors for determining the most favorable route in dependence on the stored switching data to a subscriber terminal arranged inside or outside the telecommunication network. In the network, an outgoing route from one of the private branch exchanges is led through one or more of the other private branch exchanges and/or through one or more other telecommunication networks.

9 Claims, 2 Drawing Sheets

TELECOMMUNICATION NETWORK WITH LEAST COST ROUTING

CROSS-REFERENCE TO RELATED APPLICATION

Benefit of International Application No. PCT/IB97/00405, filed on Apr. 14, 1997, and having common inventors as the present application, is claimed.

BACKGROUND OF THE INVENTION

The invention relates to a telecommunication network.

The switching of stored switching data which describe the most favorable route determined on the basis of definable functions, is a known feature in a telecommunication network. More particularly, these switching data can be determined on the basis of costs. This "least cost routing" (LCR) is a known performance feature for a telecommunication network which comprises a private branch exchange for switching functions and a plurality of subscriber terminals connected to the private branch. The route causing the least operating costs for a communication to an external subscriber terminal i.e. situated outside the telecommunication network, is determined with the aid of LCR.

U.S. Pat. No. 5,452,351 has disclosed such a private branch exchange having an LCR function. The network comprises a private branch exchange to which are assigned a plurality of subscriber terminals. The private branch exchange comprises a circuit for switching functions. Furthermore, the private branch exchange is assigned a controller which comprises storage means and processing circuits for LCR functions. An input/output device (terminal), which has a keypad for entering data and an LCD display device for reading data is connected to the controller. LCR data are applied to the controller by the input/output device and are stored in the storage means. If a call from the private telecommunication network to an external subscriber is generated by a subscriber terminal, the controller will determine the route to the called other subscriber which has the least operating costs per time interval on the basis of the LCR data stored in this controller.

LCR data are stored in tables in the storage means. Codes which are called up at an external subscriber when a call is generated and which determine the least cost route to the external subscriber are stored under specific addresses. Start and end of the route are determined by the call numbers of the calling internal subscriber and of the called external subscriber.

SUMMARY OF THE INVENTION

It is an object of the invention to provide a telecommunication network which renders, with the aid of switching data (for example, LCR functions), the respective most favorable route available to subscribers to the telecommunication network whose positions are at least partially wide apart.

The object is achieved in that a plurality of mutually coupled private branch exchanges are provided to which are assigned storage means for storing switching data and which comprise processing means for determining the most favorable route in dependence on the stored switching data to a subscriber terminal arranged inside or outside the telecommunication network, an outgoing route from one of the private branch exchanges being led through one or more of the other private branch exchanges and/or through one or more other telecommunication networks.

Such a telecommunication system is advantageous for all the users who use a plurality of internetworked private branch exchanges which make different accesses to one or more other networks possible and can utilize, for example, low-cost links between the private branch exchanges. In addition to the aspect of cost saving, the switching data can also be determined from other points of view such as, for example, from the point of view of transmission capacity or data integrity. Users are in particular large enterprises having distributed branches, which have a respective private branch exchange with a plurality of subscriber terminals. Basically, there may be assumed that a communication between the private branch exchanges lead to highly favorable conditions as regards charges. The private branch exchanges are then preferably connected to each other by point-to-point radio communication lines i.e. through fixedly switched telephone line hired from an official network provider. But also different types of connection instead of these point-to-point radio communication lines are conceivable, for example, microwave links. A subscriber to the telecommunication system according to the invention is connected to an external subscriber by a route which leads via the most favorable interface as regards charges, for example, between the telecommunication network and another network (for example, public network). With the telecommunication network according to the invention there may particularly be utilized that private branch exchanges are further apart. For example, an access to a public network will generally be effected via a respective interface of a private branch exchange which is located in the neighborhood of the called subscriber, while the private branch exchange of the calling internal subscriber may be located remote from such a private branch exchange. When the most suitable interface is selected, different charges of the different public networks are taken into account when there are a plurality of public telecommunication networks available. Furthermore, links between internal subscribers of the telecommunication network are generally led through routes within the network. More particularly, the arising costs may be minimized by the communication system according to the invention.

An embodiment of the invention provides that at least one of the private branch exchanges comprises a PC which is used for influencing the switching functions of the associated private branch exchange and which includes said storage means and processing means.

Contrary to solutions by integrated functions for route allocation based on switching data in the switching software of private branch exchanges, there is a saving of costs, more particularly of working time, when there are changes (for example, of charges). Changes in the switching software of private branch exchanges are costly and complex and, generally, only executable by skilled service staff. The use of a PC with respective user-friendly system interfaces makes a considerable simplification possible here. In addition, the available memory in the switching centers (private branch exchanges TC systems) in the private branch exchanges is limited. A PC can render additional and easily expandable memories available here. Also the processing capacity of such switching centers is limited by the limited speed and the total capacity of the processors used, which is problematic especially in complicated private communication networks having a plurality of internetworked private branch exchanges in view of a fast computation of the most favorable route between two subscribers. This problem is all the more felt when, additionally, a choice can be made between different public networks. The shift of the destination of the most favorable route in a PC also solves this problem on account of the increased total processing capacity.

In a further embodiment of the invention, the switching data are updated by a long-range data transmission from a central unit used for centrally determining the switching data, through the telecommunication network to all the private branch exchanges.

The LCR functions of the whole private telecommunication network can be adapted, for example, to changes of charges in this manner within a brief period of time. The central management and determination of the LCR data guarantee that a global and thus optimum, adaptation of the LCR data is effected when changes of charges occur. A decentralized adaptation of LCR data would lead, especially with complex networks, to more costs of operating time and the danger of errors which are linked with a non-optimum routing.

The invention relates to a private branch exchange for a telecommunication network described above, comprising storage means in which the switching data are stored and comprising processing means for influencing the switching functions of the private branch exchange in dependence on the switched data.

Exemplary embodiments of the invention will be further explained below with reference to the drawings. More particularly, a private telecommunication network with LCR data as switching data for a cost-effective switching will be described.

These and other aspects of the invention will be apparent from and elucidated with reference to the embodiments described hereinafter.

DESCRIPTION OF THE PREFERRED EMBODIMENTS

Figure 1:
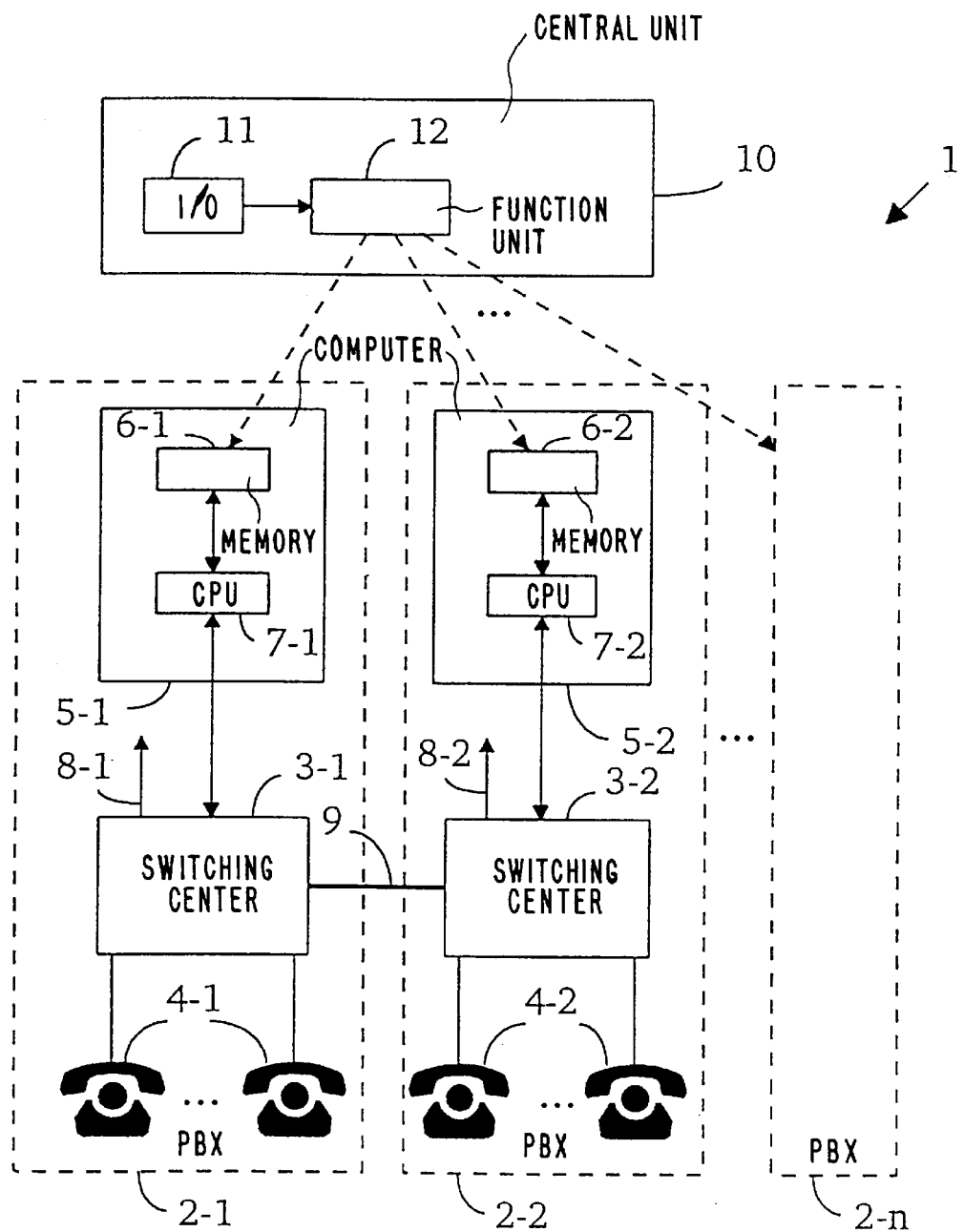
FIG. 1 shows a private telecommunication network according to the invention, comprising a central unit for managing LCR data.

The private telecommunication network 1 shown in FIG. 1 comprises a plurality of private branch exchanges 2-1, 2-2 to 2-n, where n is at least equal to 2, operating as network nodes. The private branch exchange 2-1 comprises a switching center 3-1 for the switching functions of the private branch exchange 2-1. Subscriber terminals 4-1, for example, telephones or fax machines are connected to the switching center 3-1 which is realized as a private branch exchange or TC system (PBX, telecommunication exchange). The switching center 3-1 is coupled to a computer (PC) 5-1 via a suitable interface, for example, an INAP interface (Intelligent Network Application Protocol). This computer includes a memory unit 6-1 for storing LCR data, and a processing unit 7-1 which is a microprocessor for LCR data processing. The processing unit 7-1 accesses the LCR data stored in the memory unit 6-1 and evaluates switching data from the switching center 3-1 while taking the LCR data stored in the memory unit 6-1 into account. Connections to other network nodes/subscriber terminals are established by the switching center 3-1 in dependence on the thus determined evaluation results of the processing unit 7-1 and applied to the switching center 3-1.

The structure of the further private branch exchanges 2-2 to 2-n corresponds to the private branch exchange 2-1 and will therefore not be further explained in the following. For a private telecommunication network according to the invention, at least two private branch exchanges are necessary.

The switching centers 3-1, 3-2 to 3-n of the private branch exchanges have interfaces 8-1, 8-2 to 8-n which lead out of the private telecommunication network 1 and establish links to at least one public telecommunication network. The private branch exchanges 2-1 to 2-n are furthermore internetworked. In the present case, the switching centers are coupled by point-to-point lines 9, the signaling over the point-to-point lines being effected in accordance with a suitable protocol, for example, the DPNSS standard (Digital Private Network Signaling System) or the ETSI standard QSIG. FIG. 1 only shows the point-to-point line 9 between the private branch exchanges 2-1 and 2-2 i.e. the point-to-point line between the switching centers 3-1 and 3-2. Essential to the invention is that the private branch exchanges are coupled by cost-effective communication channels. For example, also microwave links instead of or in combination with the point-to-point lines could be considered.

An updating of the LCR data in the memory units 6-1 to 6-n of the private branch exchanges 2-1 to 2-n, which is necessary, for example, when charges change, or the structure of the private telecommunication network 1 changes, is effected by a central unit 10 for LCR data management. The central unit 10 is arranged as a computer (PC) which is designed and shown as a separate unit in the present case. The functions of the central unit 10, however, can also be implemented in one of the computers 5-1 to 5-n of the private branch exchanges 2-1 to 2-n. No separate computer is then necessary for the central unit 10. The central unit 10 has an input/output unit 11 (editor) via which the data about the structure of the private telecommunication network 1 and charge data of a function unit 12 are supplied, which are used for calculating the LCR data for these memory units 6-1 to 6-n. The LCR data computed by the function unit 12 are transmitted to the memory units 6-1 to 6-n, more particularly, transmitted to the private branch exchanges 2-1 to 2-n by a remote data transmission. Advantageously are used the point-to-point lines 9 between the private branch exchanges. The LCR data, however, can also be transmitted in that the LCR data determined by the function unit are stored on diskettes or magnetic tapes or other nonvolatile storage means by which the LCR data are loaded in the memory units 6-1 to 6-n of the private branch exchanges.

With reference to FIGS. 2 to 5, further explanations will be given via examples as to how connections between subscriber/telecommunication terminals can be established by means of the LCR data.

Figure 2:
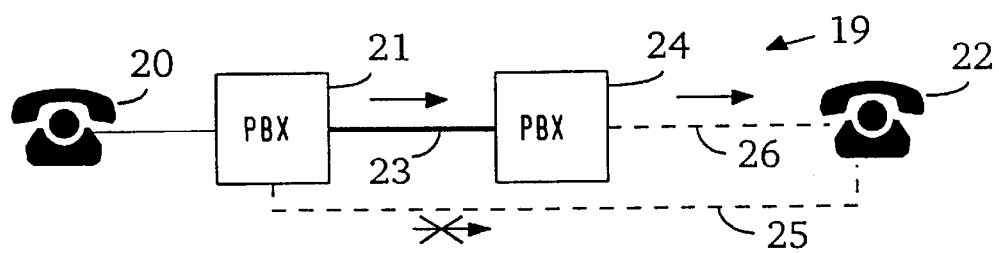
FIG. 2 to FIG. 5 show examples for determining a least-cost route from an internal subscriber terminal through the private telecommunication network to an external subscriber terminal.

In FIG. 2, a subscriber generates a call to an external subscriber or his telecommunication terminal 22 which is arranged outside the private telecommunication network via an internal telecommunication terminal 20 of a private branch exchange 21. The private branch exchange 21 is coupled to a private branch exchange 24 by a point-to-point line 23 (shown in bold lines). The private branch exchange 21 determines, with the aid of the LCR data stored in this exchange, from the call number of the telecommunication terminal 20 and the call number of the telecommunication terminal 22, the least cost route between these two subscriber terminals. In the present example, the private branch exchanges 21 and 24 are assigned to different public networks. At least at specific instants the private branch exchange 24 has a more cost-effective access to the public network assigned thereto than the private branch exchange 21, for example, because the private branch exchange 24 and the subscriber terminal 22 are assigned to the same public network. In that case, when a connection between the two user terminals 20 and 22 is to be set up, the private branch exchange 21 will not immediately access the public network assigned to this exchange to set up a connection to the user terminal 22 (see dashed line 25), but will first set up a connection by the point-to-point line 23 to the private branch exchange 24 from which the public network assigned to that private branch exchange will be accessed to set up a connection to the user terminal 22 by this route (see dashed line 26). Here are lower charges, because a change of public telecommunication networks is not necessary. The dashed lines describe links between the private telecommunication network 19 and the external telecommunication terminal 22 through one or various public networks, without including the communication routes between the private branch exchanges inside the private telecommunication network 19. This representation is also used for the FIGS. 3 to 5.

Figure 3:
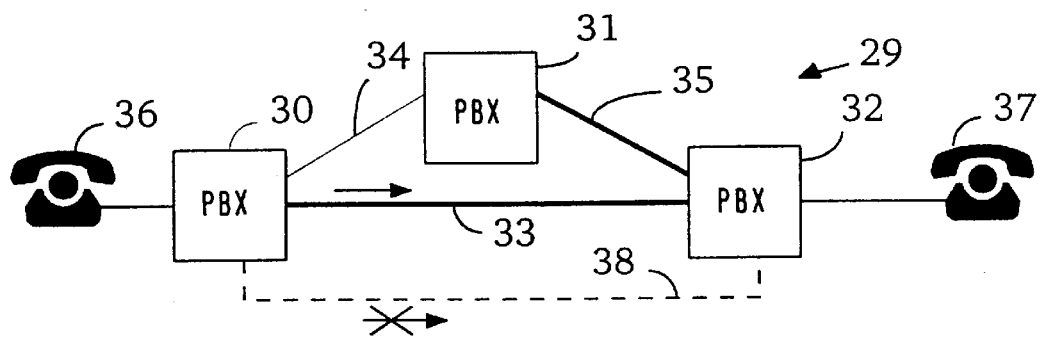

A private telecommunication network 29 in FIG. 3 has three private branch exchanges 30, 31, 32 which are interconnected by point-to-point lines 33, 34 and 35. A subscriber terminal 36 is assigned to the private branch exchange 30 and operates as one of its private branches. Furthermore, a subscriber terminal 37 working as a private branch of the private branch exchange 32 is provided, while the private branch exchange 29 forms part of the private network 29. If the subscriber to the private branch exchange 36 generates a call to the subscriber terminal 37, a private telecommunication network without LCR function would directly access a public network via the private branch exchange 30 and set up a connection on this route to the private branch exchange 32 (dashed line 38), while the connection to the subscriber terminal 37 would be switched through by the private branch exchange 32. In the present private telecommunication network with LCR function according to the invention, however, the point-to-point line 33 for setting up a connection between the two private branch exchanges 30 and 32 is used while the use of public communication networks is omitted, so that the charges for the use of one or more public networks do not apply.

Figure 4:
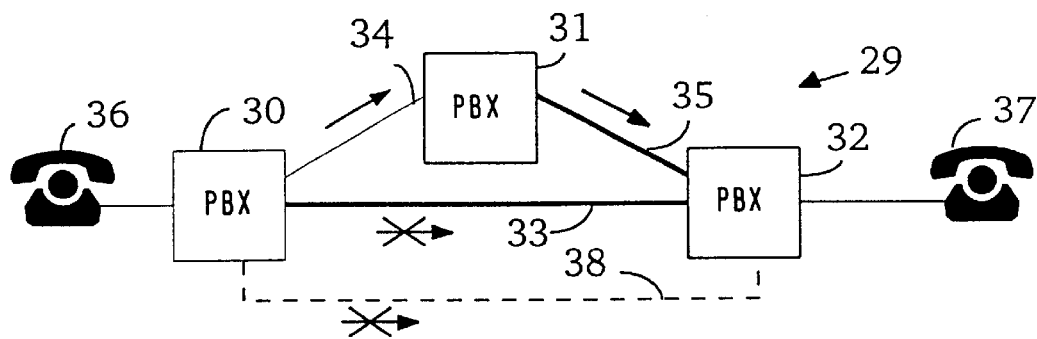

The same constellation on which FIG. 3 is based is used for the example shown in FIG. 4, but there the case is shown that the point-to-point line 33 is occupied, so that it is unavailable for setting up a connection between the private branch exchanges 30 and 32. This fact is processed by the private branch exchange 30 with the LCR data stored therein, so that, in lieu thereof, the connection between the private branch exchanges 30 and 32 is set up via the private branch exchange 31 while the point-to-point lines 34 and 35 are used. For the case (not shown) where also the point-to-point line 34 and/or the point-to-point line 35 are occupied, the private branch exchange 30 will directly access the public network and set up a connection to the private branch exchange 32 and thus to the subscriber terminal 37 along route 38.

Figure 5:
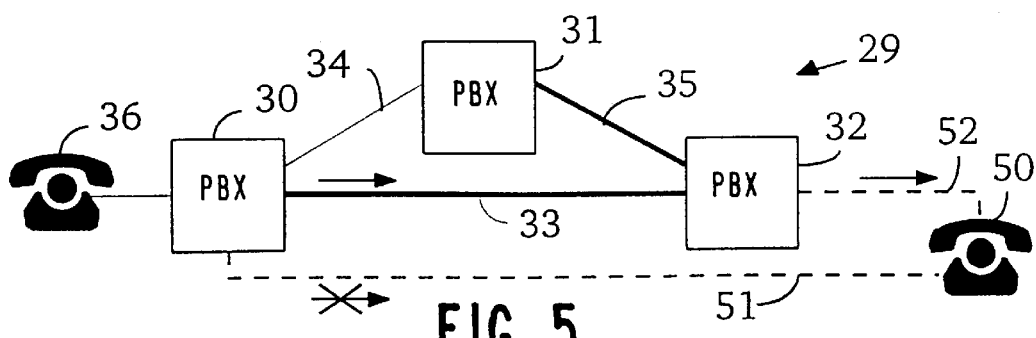

FIG. 5 shows a derivation of the embodiment shown in FIG. 3, in that a subscriber terminal 50 is called by the subscriber terminal 36, while the subscriber terminal 50 has its own network terminal to a public network and does not operate as a private branch for a private branch exchange. The observations made with respect to FIGS. 3 and 4 accordingly hold for the constellation shown in FIG. 5, with the exception that when the private branch exchange 32 is included, a connection to the subscriber terminal 50 is set up through at least one public network (see dashed line 52). Similarly, a direct route 51 through one or more public networks from the private branch exchange 30 to the subscriber terminal 50 is possible, but is only used in the case where a route over the point-to-point line 33 or the point-to-point lines 34 and 35 is impossible, because they are occupied. Obviously, the embodiments also apply to the case where the connection to the subscriber terminal 50 is effected via a private branch exchange working as a network node of the public network, while the subscriber terminal is assigned as a private branch to the private branch exchange.

The cases shown in FIGS. 2 to 5 may be combined as optionally chosen. For clarity, the FIGS. 2 to 5 show only private telecommunication networks having few private branch exchanges (network nodes). However, the invention can easily be applied to complex private telecommunication networks. Especially then the potential saving of costs is larger, more particularly, when the various private branch exchanges of the private telecommunication network are further apart, because there are then multiple possibilities for setting up connections by various routes between telecommunication terminals. It is then often possible to shift the access to a public network to a private branch exchange which, for example, on the basis of its spatial proximity to the called subscriber, allows of a communication with this subscriber at less cost per time interval.

A realization of LCR functions is described, for example, in U.S. Pat. No. 5,452,351 mentioned above. For determining the optimum route from the private telecommunication network to the called subscriber, it is advantageous to define the selectable routes on the basis of a tree structure. As a result of the LCR data, charges arising per time interval are assigned to each route. When a connection is set up. the least cost route is determined by means of the tree structure. It is then also taken into account that certain routes are unsuitable, because connections between the private branch exchanges are occupied.

What is claimed is:

1. A private telecommunication network comprising:

a plurality of mutually coupled private branch exchanges operating as network nodes to which are assigned respective storage means for storing LCR (Least Cost Routing) data and which include processing means for determining a favorable route in dependence on the stored LCR data to a subscriber terminal arranged inside or outside the private telecommunication network, and a central unit for determining the LCR data, wherein the favorable route from one of the plurality of private branch exchanges includes a path through at least one of an other private branch exchange, a public network, and both said other private branch exchange and said public network, and wherein the central unit LCR data are calculate in advance for the entire private telecommunication network including all network nodes using data pertaining to the structure of the private telecommunication network and charge data.

2. A private telecommunication network as claimed in claim 1, characterized in that at least one of the private branch exchanges (2-1, 2-2, . . . 2-n, 21, 24, 30, 31, 32) comprises a PC (5-1, 5-2, . . . 5-n) which is used for influencing the switching functions of the associated private branch exchange and which includes said storage means (6-1, 6-2, . . . 6-n) and processing means (7-1, 7-2, . . . 7-n).

3. A private telecommunication network as claimed in claim 1, characterized in that the private branch exchanges (2-1, 2-2, . . . 2-n, 21, 24, 30, 31, 32) are mutually coupled by point-to-point lines (9, 21, 33, 34, 35).

4. A private branch exchange for a private telecommunication network (1) as claimed in claim 1, characterized in that storage means (6-1, 6-2, . . . 6-n) are provided in which the switching data are stored and in that processing means (7-1, 7-2, . . . 7-n) are provided for influencing the switching functions of the private branch exchange in dependence on the switching data.

5. A private telecommunication network according to claim 1, wherein the favorable route is determined in accordance with a least cost route.

6. A private telecommunication network according to claim 1, wherein the favorable route is determined based upon transmission capacity.

7. A private telecommunication network according to claim 1, wherein the favorable route is determined based upon data integrity of transmission.

8. A private telecommunication network according to claim 1, wherein at least two of the plurality of mutually coupled private branch exchanges are coupled using a wireless interface.

9. A private telecommunication network according to claim 1, wherein the respective processing means comprise a stand-alone computer coupled to respective private branch exchanges through a communication interface.

* * * * *